United States Patent
Hashimoto et al.

[11] Patent Number: 6,050,383
[45] Date of Patent: Apr. 18, 2000

[54] DAMPER DISK ASSEMBLY

[75] Inventors: Hideki Hashimoto, Katano; Keisuke Fujioka, Shijonawate, both of Japan

[73] Assignee: Exedy Corporation, Neyagawa, Japan

[21] Appl. No.: 09/207,993

[22] Filed: Dec. 9, 1998

[30] Foreign Application Priority Data

Dec. 12, 1997 [JP] Japan ................................. 9-343359

[51] Int. Cl.$^7$ ................................................. F16D 3/14
[52] U.S. Cl. ................................ 192/213.12; 192/70.17; 464/68
[58] Field of Search .................... 192/213.11, 213.12, 192/213.21, 213.22, 70.17; 464/63, 68

[56] References Cited

U.S. PATENT DOCUMENTS

| | | | |
|---|---|---|---|
| 4,562,913 | 1/1986 | Cucinotta et al. ................. | 192/213.12 |
| 4,596,324 | 6/1986 | Braun ................................. | 192/231.12 |
| 4,603,767 | 8/1986 | Blond ................................. | 182/231.12 |
| 4,693,354 | 9/1987 | Umeyama et al . ............... | 192/70.17 X |
| 4,698,045 | 10/1987 | Billet et al. ...................... | 195/231.12 X |
| 4,846,759 | 7/1989 | Worner et al. .................. | 192/213.12 X |
| 4,895,237 | 1/1990 | Maucher ............................ | 192/213.12 |
| 5,518,099 | 5/1996 | Murphy ............................ | 192/213.12 X |
| 5,590,752 | 1/1997 | Takehira et al. ................ | 464/68 X |
| 5,769,721 | 6/1998 | Tauvron et al. ................ | 192/231.12 X |
| 5,816,925 | 10/1998 | Mizukami ........................ | 192/213.22 X |
| 5,885,160 | 3/1999 | Tauvron .......................... | 192/213.12 X |
| 5,890,576 | 4/1999 | Imanaka et al. ................ | 192/213.22 X |
| 5,908,099 | 6/1999 | Kleifges ............................ | 192/70.17 X |

FOREIGN PATENT DOCUMENTS 2735548  12/1996  France .

*Primary Examiner*—Charles A. Marmor
*Assistant Examiner*—Scott Lund
*Attorney, Agent, or Firm*—Shinjyu An Intellectual Property Firm

[57] ABSTRACT

A clutch disk assembly 1 includes a second plate 13, an output rotary member 4, an intermediate body 3, an intermediate member 9b, second springs 10, third springs 5 and a damper 8. The intermediate body 3 is disposed radially outside the output rotary member 4. The intermediate member 9b is disposed near the output rotary member 4 and the intermediate body 3. The second plate 13 is located on a second axial side of the intermediate body 3. The second springs 10 circumferentially and elastically couple the plate 9b and the intermediate body 3 together. The third springs 5 circumferentially and elastically couple the intermediate body 3 and the second plate 13 together. The damper 8 is axially shifted from the intermediate body 3. The damper 8 has first springs 7 circumferentially and elastically coupling the output rotary member 4 and the plate 9b together.

4 Claims, 7 Drawing Sheets ability # DAMPER DISK ASSEMBLY

BACKGROUND OF THE INVENTION

A. Field of the Invention

The invention relates to a damper disk assembly, and particularly a damper disk assembly for transmitting a torque and for absorbing and damping a torsional vibration.

B. Description of the Background Art

A clutch disk assembly used in a clutch of a vehicle has a clutch function for releasable engagement with a flywheel, and also has a damper function for damping a torsional vibration. The clutch disk assembly includes a clutch coupling portion, an input plate fixed to the clutch coupling portion, a hub disposed radially inside the input plate, and elastic members elastically coupling the input plate to a flange of the hub in a circumferential direction. When the clutch coupling portion is coupled to the flywheel, torque is supplied to the clutch disk assembly from the flywheel. Torque is transmitted to the hub via the elastic members, and then is output to a shaft extending from a transmission. When variations in torque of the engine is transmitted to the clutch disk assembly, relative rotation occurs between the input plate and the hub, and the elastic members are repetitively and circumferentially compressed. The clutch disk assembly further includes a friction mechanism which is arranged between the input plate and the hub for generating a frictional resistance when the relative rotation occurs therebetween. The friction mechanism is formed of a plurality of washers, a biasing member and others.

In a clutch disk assembly of a hub-separate type, the flange is separate from the hub, and is used as an intermediate member. The hub and the intermediate member are circumferentially coupled together by elastic members having a low rigidity. In this clutch disk assembly, a maximum torsional angle between the input plate and the hub can be increased, and operation characteristics can have two stages of low and high rigidities.

In a torsional vibration system that operates with the clutch disk assembly, for instance the transmission and other components of the drive system, normal vibrations in rotation speed of the engine continuously cause collision between teeth of paired gears in the transmission, and thereby cause noises sometimes referred to as idle rattle. For reducing the torsional vibration causing the gear noises in the clutch disk assembly, it is necessary to reduce a spring constant of the elastic members of a low rigidity for the first stage. However, for damping the torsional vibration such as a low frequency vibration, which causes the relative rotation of a large angle, it is necessary to increase a spring constant of the elastic members functioning in the second state. In the conventional device having such characteristics, a jumping phenomenon occurs. In other words, the operation angle jumps over between the first stage and second stage, for example, when a torque variation is supplied during idling. The jumping phenomenon is caused by oscillations in transmission of the inertia with respect to the elastic members which are provided in the clutch disk assembly for the second stage of dampening characteristics, and causes gear collision to an extent higher than the normal gear collision due to excessive rotational variations.

SUMMARY OF THE INVENTION

An object of the invention is to provide a damper disk assembly in a clutch disk assembly with means for preventing engagement between outer gear teeth on a hub and inner teeth on a separate flange.

According to a first aspect of the invention, a damper disk assembly includes a hub, a first circular plate member, an intermediate member, a second circular plate member, a second elastic member, a third elastic member and a damper. The first circular plate member is disposed radially outside the hub. The intermediate member is disposed near the hub and the first circular plate member. The second circular plate member is arranged on a second axial side of the first circular plate member. The second elastic member circumferentially and elastically couples the intermediate member and the first circular plate member together. The third elastic member circumferentially and elastically couples the first and second circular plate members. The damper has a first elastic member circumferentially and elastically coupling the hub and the intermediate member together, and is axially offset from the first circular plate member.

In this damper disk assembly, the damper having the first elastic member, which functions as a spring for a first stage in torsion characteristics, is disposed at a position axially offset from the first circular plate member. Therefore, a sufficiently large contact area can be ensured between contact portions of the hub and the first circular plate member.

According to a second aspect, the damper disk assembly is such that the hub has a radially projected portion. The damper is disposed radially outside the hub and axially between the projected portion and the second circular plate member.

According to a third aspect, the damper disk assembly is such that the damper has a second member non-rotatably engaged with the intermediate member, and a first elastic member circumferentially and elastically coupling the first and second members together.

According to a fourth aspect, the damper disk assembly of the third aspect further has such a feature that the first and second members are relatively rotatable in the circumferential direction with respect to each other, and the first and second members have sliding portions in contact with each other. The damper further has a biasing member axially biasing the first and second members toward each other.

In this damper disk assembly, the first and second members produce intended friction by sliding of the sliding portions in a first stage of a torsion angle. In the structure, the damper produces a frictional resistance from the first and second members which are coupled together by the first elastic member. Therefore, an additional member for producing the frictional resistance is not required.

According to a fifth aspect, the damper disk assembly of the fourth aspect further has such a feature that the second member is axially movably engaged with the hub. The biasing member is an elastic member arranged and compressed axially between the projected portion and the second member. The first member is axially engaged with the second circular plate member.

In this damper disk assembly, the first member is axially biased toward the second member by the biasing member, and the first member is held between the second member and the second circular plate member.

According to a sixth aspect, the damper disk assembly is such that the first elastic member is axially supported by the second circular plate member.

In this damper disk assembly, the first elastic member is axially carried by the second circular plate member. Therefore, an additional member for axially carrying the first elastic member is not required.

DESCRIPTION OF THE PREFERRED EMBODIMENTS

Figure 1:
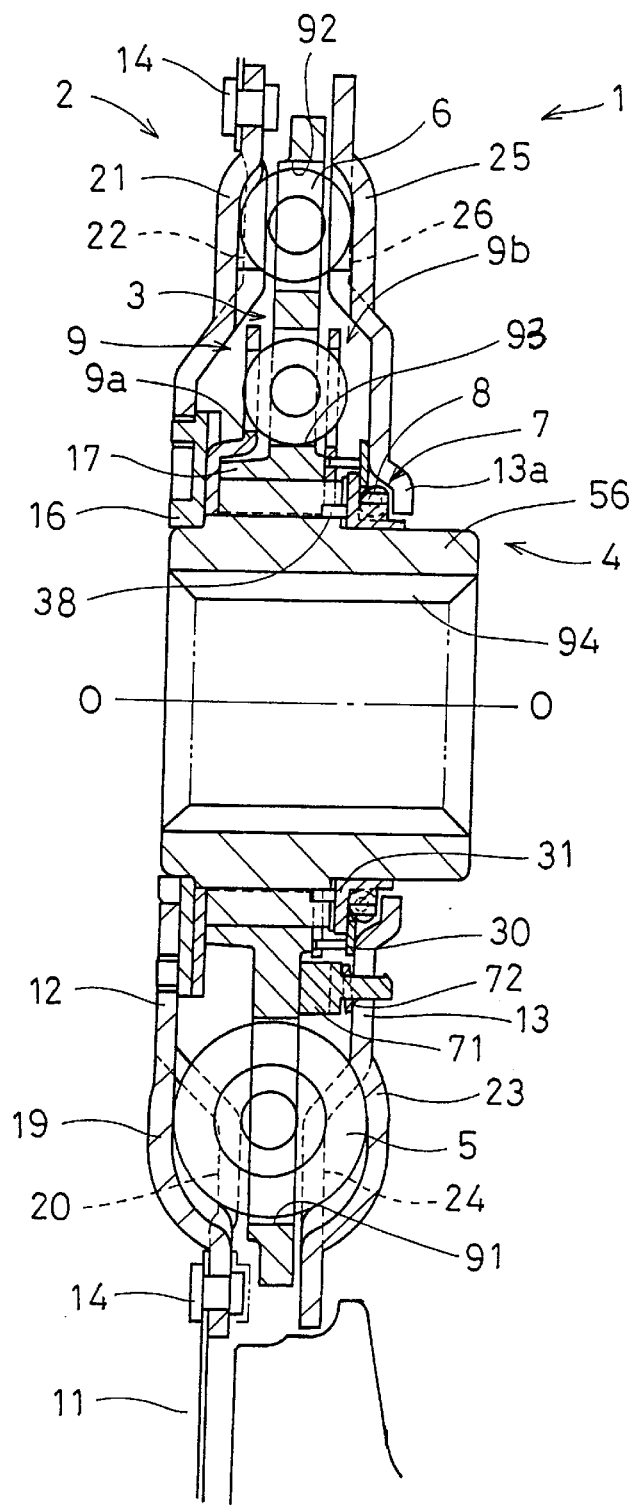
FIG. 1 is a fragmentary, cross section of a clutch disk assembly having a damper mechanism in accordance with one embodiment of the invention.
Figure 2:
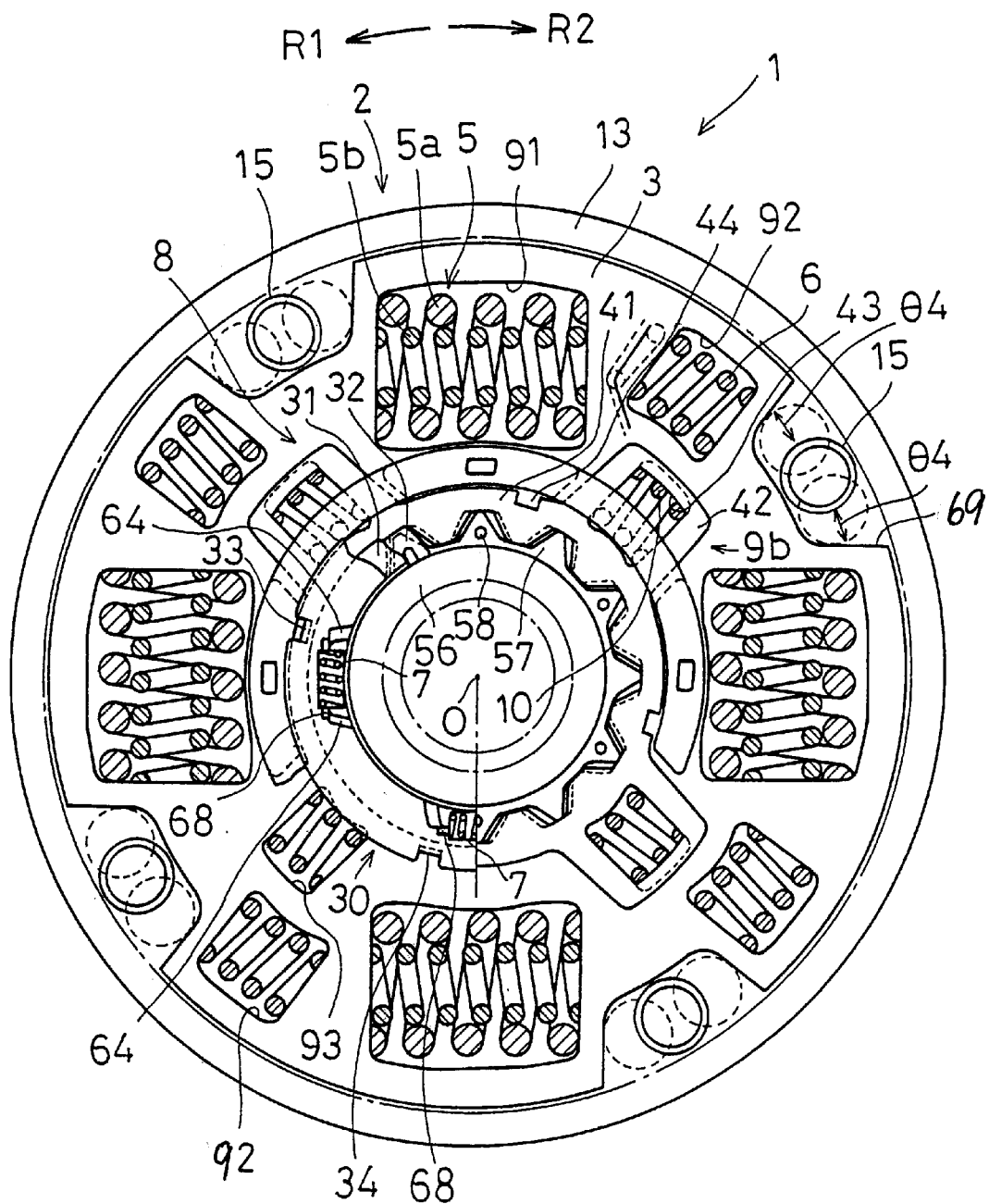
FIG. 2 is a part cross-section, part cutaway end view of the clutch disk assembly depicted in FIG. 1 with a plate member removed to show various features of the present invention.
Figure 3:
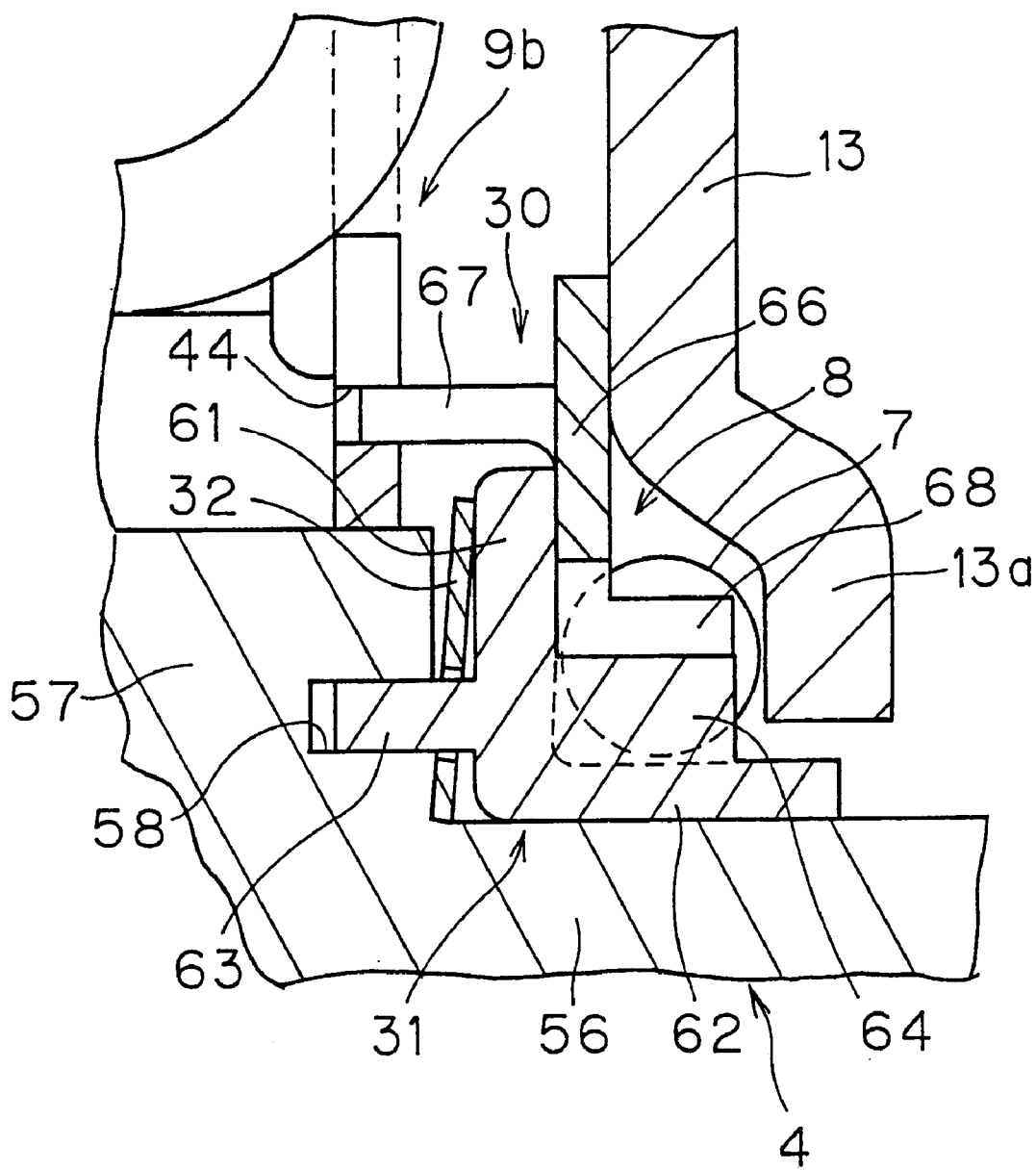
FIG. 3 is a fragmentary, cross-section view showing, on an enlarged scale, a portion of the damper mechanism of the clutch disk assembly depicted in FIG. 1.
Figure 4:
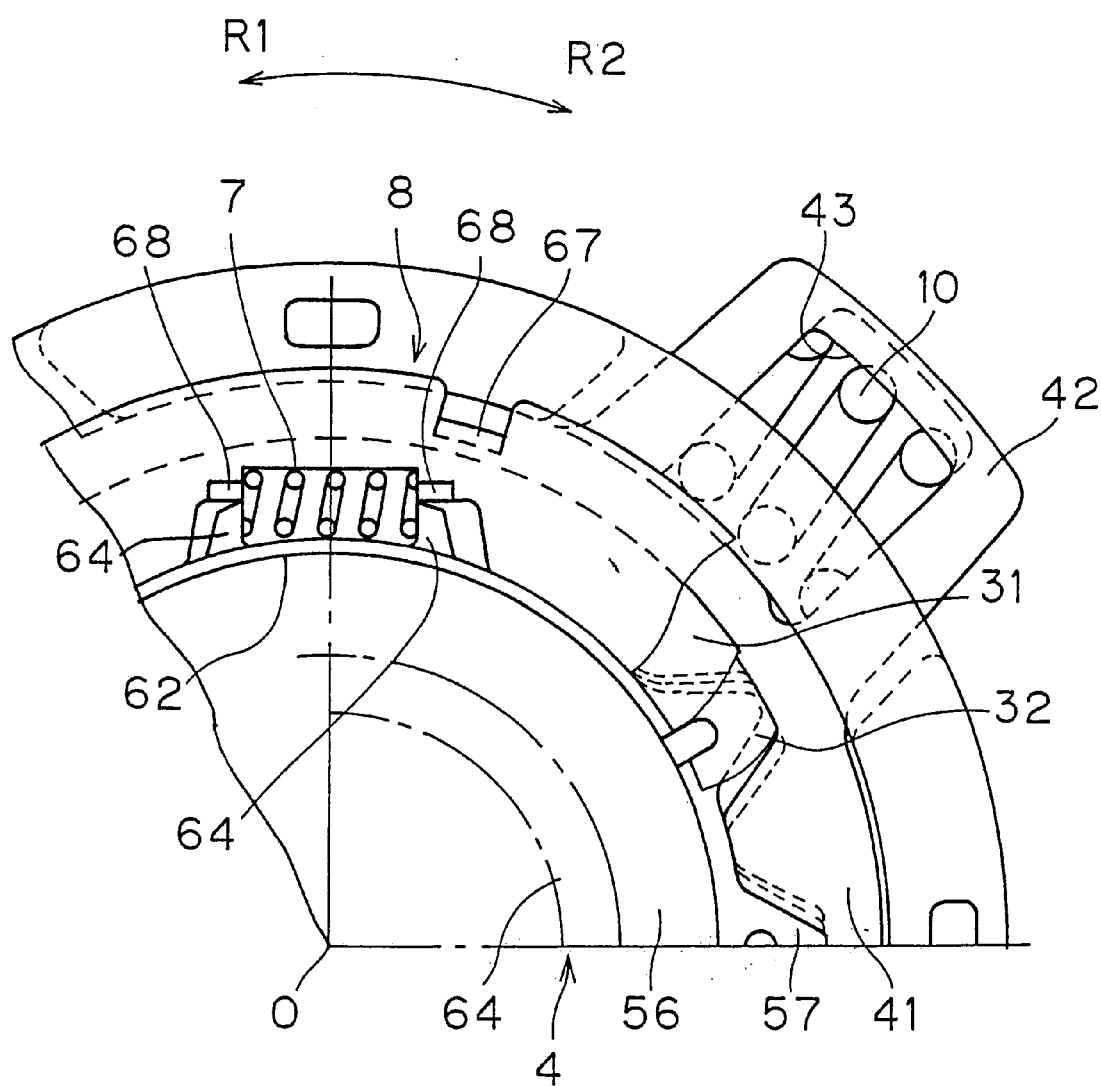
FIG. 4 is a fragmentary end view of a portion of the damper depicted in FIGS. 1 and 3.

FIGS. 1 and 2 show a clutch disk assembly 1 in accordance with one embodiment of the present invention. The clutch disk assembly 1 is used in a clutch mechanism of a vehicle. A flywheel (not shown) is disposed on the left side of the clutch disk assembly 1 in FIG. 1, and a transmission (not shown) is disposed on the right side in FIG. 1. In the following description, the left side in FIG. 1 is referred to as a "first axial side", and the right side in FIG. 1 is referred to as a "second axial side". The line 0—0 in FIG. 1 represents a rotation axis of the clutch disk assembly 1. R1 in FIG. 2 indicates a direction of rotation of the flywheel and the clutch disk assembly 1, and R2 indicates a reverse rotational direction.

The clutch disk assembly 1 is basically formed of an input rotary member 2, an intermediate body 3, an output rotary member 4, third springs 5, fourth springs 6, second springs 10 and a damper 8. The input rotary member 2 is a member receiving a torque from the flywheel (not shown). The output rotary member 4 in this embodiment is a hub, and is relatively unrotatably and axially movably fitted to a shaft (not shown) extending from the transmission. The intermediate body 3 is arranged between the input rotary member 2 and the output rotary member 4. The third and fourth springs 5 and 6 are provided for circumferentially and elastically coupling the input rotary member 2 and the intermediate body 3 together. The damper 8 is a mechanism provided for circumferentially and elastically coupling the intermediate body 3 and the output rotary member 4 together, and has first springs 7.

Structures of various portions of the clutch disk assembly 1 will be described below more in detail.

The input rotary member 2 is basically formed of a friction portion 11 (clutch disk), a first plate 12 and a second plate 13.

The friction portion 11 is an annular member disposed near a friction surface of the flywheel. The friction portion 11 is basically formed of a pair of facings and a cushioning plate.

First and second plates 12 and 13 are annular members and are axially spaced from each other by a predetermined distance. The outer peripheral portions of the first and second plates 12 and 13 are fixed together by a plurality of pins 15 which are circumferentially spaced from each other. Thereby, the first and second plates 12 and 13 are spaced from each other by a constant axial distance, and can rotate together. The cushioning plate of the friction portion 11 is fixed to the outer peripheral portion of the first plate 12 by rivets 14.

The first plate 12 is provided with first receiver portions 19 which are circumferentially equally spaced from each other. Each first receiver portion 19 is slightly deformed such that it extends with an arcuate shape in the axial direction. Adjacent to each end of each first receiver portion 19 is a first contact portion 20 at circumferentially opposite ends thereof. The first contact portions 20 are circumferentially opposed to each other. The first plate 12 is provided with a plurality of second receiver portions 21 arranged in the circumferential direction. Each second receiver portion 21 has an arcuate contour slightly extending toward the first axial side. There are second contact portions 22 formed at each circumferentially opposite end of each second contact portion 22. The second contact portions 22 are circumferentially opposed to each other.

The second plate 13 is provided with a plurality of first receiver portions 23 which are circumferentially equally spaced from each other. The first receiver portions 23 are formed correspondingly to the first receiver portions 19, respectively, and each have first contact portions 24 at circumferentially opposite ends thereof. The second plate 13 is further provided with a plurality of second receiver portions 25 arranged in the circumferential direction. The second receiver portions 25 are formed correspondingly to the second receiver portions 21, respectively, and each have second contact portions 26 at circumferentially opposite ends thereof. The first receiver portions 19 and 23 are longer in both the circumferential and radial directions than the second receiver portions 21 and 25.

An annular bushing 16 is disposed on the inner periphery of the first plate 12. The bushing 16 is supported rotatably on the outer peripheral surface of a hub 56 of the output rotary member 4. Thereby, the input and output rotary members 2 and 4 are radially positioned with respect to each other. The bushing 16 is in contact with the surfaces, on the first axial side, of outer teeth 57, as described below.

The intermediate body 3 is a circular or annular member disposed axially between the first and second plates 12 and 13. The intermediate body 3 is larger in axial thickness than the first and second plates 12 and 13. The intermediate body 3 is provided with circumferentially extended first windows or apertures 91 as shown in FIG. 2. The first windows 91 are disposed in locations corresponding to the first receiver portions 19 and 23 in the plates 12 and 13. The intermediate body 3 is further provided with a plurality of second windows 92 arranged in the circumferential direction. The second windows 92 are arranged correspondingly to the second receiver portions 21 and 25.

The third springs 5 are accommodated in the first windows 91, respectively. Each third spring 25 is a combination of large and small coil springs 5a and 5b. The circumferentially opposite ends of each third spring 5 are in contact with the circumferentially opposite ends of the first window 91 and the first contact portions 20 and 24 of the plates 12 and 13. The third springs 5 are prevented from moving radially outward and axially outward by the receiver portions 19 and 23.

The fourth springs 6 are arranged in the second windows 92, respectively. Each fourth spring 6 is a coil spring as can be seen from FIG. 2. The circumferentially opposite ends of the fourth spring 6 are in contact with the circumferentially opposite ends of the corresponding second window 92. The circumferentially opposite ends of the fourth spring 46 are spaced from the contact portions 22 and 26 by torsion angles ($\theta_{31}$, $\theta_2$), respectively.

The intermediate body 3 is provided at its outer periphery with a plurality of circumferentially arranged recesses 69. Each recess 69 extends in the circumferential direction, and the pins 15 extend through the recesses 69, respectively. Each pin 15 is spaced from each of the circumferentially opposite ends of the corresponding recess 69 by a fourth torsion angle ($\theta_4$–$\theta_2$).

The intermediate body 3 is provided with third windows 93 which are located between the neighboring first windows 91 and radially inside the second windows 92. Each third window 93 has a nearly rectangular form extending in the circumferential direction.

The intermediate body 3 is provided at its inner peripheral portion with a cylindrical portion 17 extending toward the first axial side. The cylindrical portion 17 is provided with a plurality of first inner teeth 45 projected radially inward. Each first inner tooth 45 has an R1-side surface 71 on its forward side in the rotating direction R1, and has an R2-side surface 72 on its rearward side.

The output rotary member 4 is basically formed of a cylindrical boss 56 extending in the axial direction. The boss 56 extends through the central apertures of the first and second plates 12 and 13. The boss 56 is provided at its inner periphery with a plurality of spline grooves 94. The boss 56 is provided with a plurality of outer teeth 57 projected radially outward. The boss 56 is provided with an annular flange portion having a short radial length and located between the outer teeth 57. The outer teeth 57 is arranged correspondingly to the cylindrical portion 17. Each outer tooth 57 extends between the circumferentially neighboring second inner teeth 37, and is circumferentially spaced from each neighboring tooth 37 by a predetermined angle. Each outer tooth 57 is provided at its forward side in the rotating direction R1 with an R1-side surface 81, and is provided at its rearward side with an R2-side surface 82. Apertures 58 having a predetermined depth are formed in surfaces, on the second axial side, of the outer teeth 57 at alternate positions.

The intermediate member 9 is formed of a pair of plates 9a and 9b. The plate 9a is arranged between inner peripheral portions of the first plate 12 and the intermediate body 3. The plate 9a is an annular member, and is formed of an annular portion and projected portions 42 which are bent with respect to the annular portion and extend radially outward. The projected portions 42 are provided with windows 43 arranged correspondingly to the third windows 93 in the intermediate body 3, respectively. The annular portion 41 of the plate 9a extends between the bushing 16 rigidly fixed to the first plate 12 and the cylindrical portion 17 of the intermediate body 3.

The plate 9b is disposed between the inner peripheral portions of the intermediate body 3 and the second plate 13. The plate 9b is basically formed of an annular portion 41 and a plurality of projected portions 42 that extend radially outward from the annular portion 41. The projected portions 42 are formed corresponding to the third windows 93 in the intermediate body 3. The projected portions 42 are provided with windows 43. Each second spring 10 is accommodated in the third window 93 of the intermediate body 3 and the windows 43 of the plates 9a and 9b. The plates 9a and 9b restrict the radially outward and axially outward movement of the second springs 10. The plate 9b differs from plate 9a in that the annular portion 41 and the projected portions 42 are flat, and the annular portion 41 is in contact with the surface of the cylindrical portion 17 on the second axial side.

The annular portion 41 of each of the plates 9a and 9b is provided at its inner periphery with a plurality of first inner teeth 45. The first inner teeth 45 are formed to correspond to the plurality of second inner teeth 37, respectively, and extend between the outer teeth 57. Each first inner tooth 45 is circumferentially longer than the second inner tooth 37, and therefore extends in the circumferentially opposite directions beyond the second inner tooth 37. Each first inner tooth 45 is provided at its forward side in the rotating direction R1 with an R1-side surface 84, and is also provided at its rearward side with an R2-side surface 83.

A space of the first torsion angle $\theta_1$ is kept between each outer tooth 57 and each of the first inner teeth 45 circumferentially neighboring thereto. More specifically, the space defined by the first torsion angle $\theta_1$ is confined between the R1-side surface 81 of the outer tooth 57 and the R2-side surface 83 of the first inner tooth 45, and is also confined between the R2-side surface 82 of the outer tooth 57 and the R1-side surface 84 of the first inner tooth 45.

A space defined by the second torsion angle $\theta_2$ is confined between each outer tooth 57 and each of the second inner teeth 37 circumferentially neighboring thereto. More specifically, the space of the second torsion angle $\theta_2$ is formed between the R1-side surface 81 of the outer tooth 57 and the R2-side surface 85 of the second inner tooth 37, and is also kept between the R2-side surface 82 of the outer tooth 57 and the R1-side surface 86 of the second inner tooth 37.

On each of the circumferentially opposite sides of the outer tooth 57, the second torsion angle $\theta_2$ is larger than the first torsion angle $\theta_1$. The first torsion angle $\theta_1$ on the R2 side of the outer tooth 57 is larger than that on the R1 side with the clutch disk assembly in a torsion free state. The second torsion angle $\theta_2$ on the R2 side of the outer tooth 57 is larger than that on the R1 side. It should be understood that when referring to the angle $\theta_1$ the inventors are referring to the combination of the angles $\theta_1$ defined on each side of the tooth. Similarly, when referring to the angle $\theta_2$ the inventors are referring to the combination of the two angles $\theta_2$ on each side of the tooth, since when there is relative rotation between the various parts, the specific angle on one side of the tooth diminishes in size while the corresponding angle on the opposite side of the tooth increases in size due to the relative rotation.

The outer teeth 57, first inner teeth 45 and second inner teeth 37 are formed continuously on corresponding surfaces throughout the surface's entire circumference. In other words, the respective teeth are formed uniformly about the circumference of respective surfaces of the hub and plate members. As a result, contact areas of the outer teeth 57 with respect to the first and second inner teeth 45 and 37 can be large, and therefore the surface pressure per square inch can be small so that wear and breakage can be suppressed.

The foregoing fourth torsion angle $\theta_4$ is larger than the third torsion angle $\theta_3$, and each of the third and fourth torsion angles $\theta_3$ and $\theta_4$ is larger than the second torsion angle $\theta_2$.

The intermediate member 9 is arranged to cooperate with the second springs 10 to transmit a torque between the output rotary member 4 and the intermediate body 3.

Figure 5:
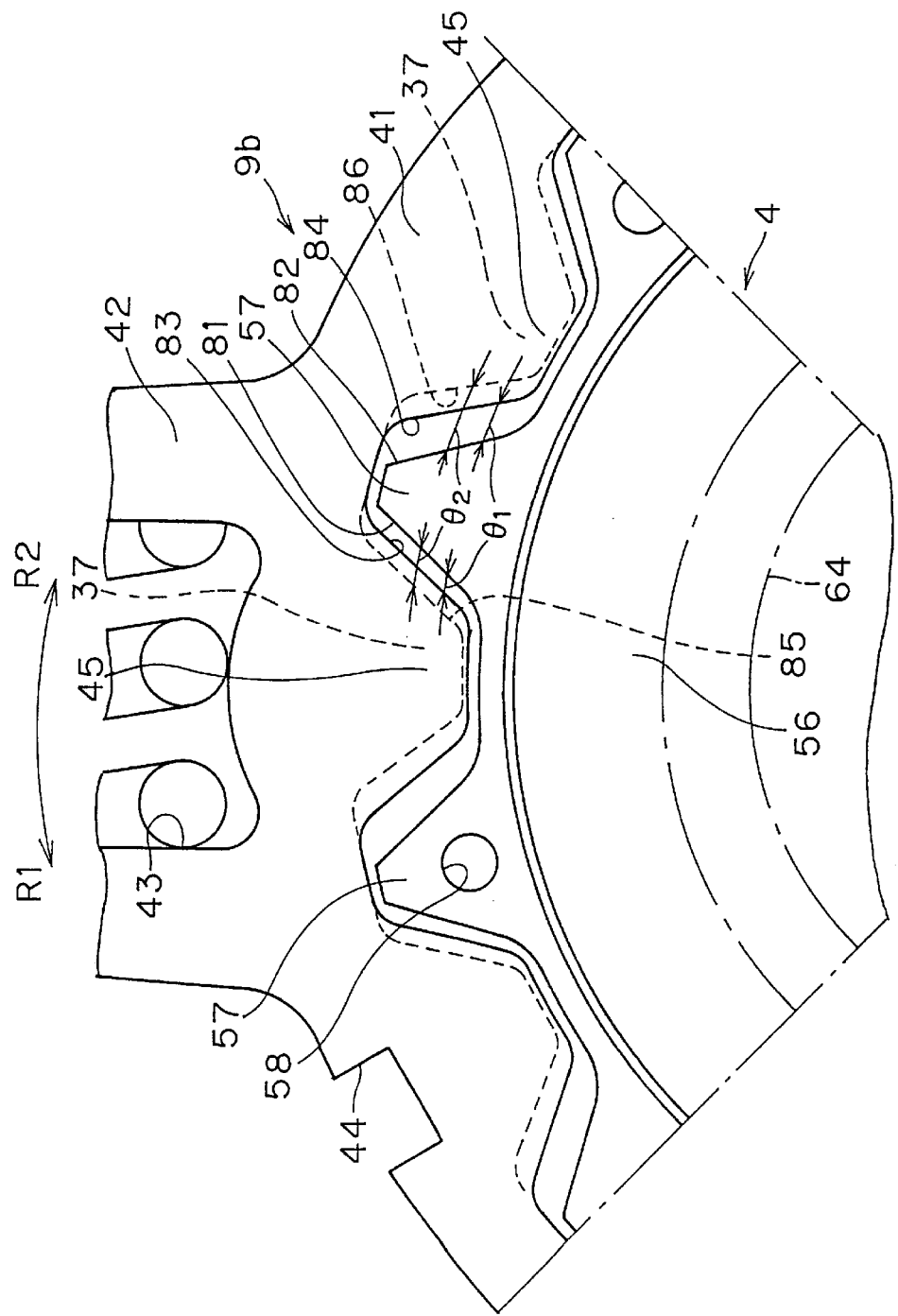
FIG. 5 is a fragmentary end view showing various features an output rotary member, an intermediate body, an intermediate member and a stop of the clutch disk assembly depicted in FIG. 1.

The plate 9b is provided at its outer periphery with a plurality of recesses 44 as shown in FIG. 5. The recesses 44 form engagement portions for the damper 8 which will be described below.

The damper 8 will now be described below. The damper 8 is provided for transmitting a torque between the output rotary member 4 and the intermediate member 9 and for absorbing and damping torsional vibration therebetween. The damper 8 is formed of a first member 30, a second member 31 and first springs 7. The first springs 7 are circumferentially compressible between the first and second members 30 and 31 in response to relative rotation between the member 4 and the member 9. The damper 8 is disposed between the outer teeth 57 and the second plate 13, and therefore is also adjacent to the cylindrical portion 17 and the radially inner portion of the plate 9b. Thus, the damper 8 is axially offset from the engageable surfaces of the outer teeth 57 and the second inner teeth 37. Therefore, the contact area of the outer teeth 57 with respect to the first and second inner teeth 45 and 37 can be sufficiently large.

The first member 30 of the damper 8 is an annular plate, and is disposed axially between the plate 9b and the second plate 13. The first member 30 functions as an input member in the damper 8, and rotates together with the plate 9b. More specifically, the first member 30 includes an annular main portion 66. The first member 30 also includes a plurality of engagement portions 67, which are formed on the outer periphery of the main portion 66 and are bent toward the first axial side. Each engagement portion 67 extends axially movably through the recess 44, and has the circumferentially opposite ends in contact with the edges of the recess 44. The main portion 66 is provided at its inner periphery with a plurality of recessed which are circumferentially equally spaced from each other. Engagement portions 68 are formed on the first member 30 by partially cutting and bending portions thereof toward the second axial side.

The second member 31 functions as an output member in the damper 8, and rotates together with the output rotary member 4. More specifically, the second member 31 has an annular form, and is made of, e.g., resin or the like. The second member 31 is disposed radially inside the first member 30. The second member 31 is basically formed of a circular plate portion 61 and a cylindrical portion 62 extending from the inner periphery of the circular plate portion 61 toward the second axial side. The side surface, on the second axial side, of the radially outer portion of the circular plate portion 61 is in contact with the radially inner portion of the surface, on the first axial side, of the main portion 66 of the first member 31. The inner peripheral surface of the cylindrical portion 62 is in contact with the outer peripheral surface of the boss 56.

A conical spring 32 is arranged between the circular plate portion 61 and the outer teeth 57. The conical spring 32 is axially compressed between the outer teeth 57 and the circular plate portion 61, and biases the circular plate portion 61 toward the second axial side. Consequently, the radially outer portion of the circular plate portion 61 biases the radially inner portion of the main portion 66 of the first member 31 toward the second axial side, and the side surface, on the second axial side, of the radially outer portion of the main portion 66 is in contact with the side surface of the radially inner portion of the second plate 13. In other words, the second plate 13 axially supports the first member 30.

A plurality of engagement portions 63 project toward the first axial side from the circular plate portion 61. The engagement portions 63 extend through apertures formed in the conical spring 32, and are engaged with the apertures 58 formed in the outer teeth 58, respectively. Thereby, the second member 31 can rotate together with the output rotary member 4. The engagement portions 63 are axially movably fitted into the apertures 58, respectively. Consequently, the second member 31 is relatively non-rotatably and axially movably engaged with the output rotary member 4.

A plurality of contact portion pairs 64, which are circumferentially equally spaced from each other, are formed on the radially inner portion of the circular plate portion 61 around the cylindrical portion 62. The contact portions 64 in each pair are formed to correspond the engagement portions 68, respectively, and are circumferentially spaced from each other.

The first spring 7 is a coil spring having the lowest rigidity, and is disposed between the first and second members 30 and 31. Each first spring 7 is disposed between the paired contact portions 64 of the second member 31. Therefore, the first axial side of the first spring 7 is supported by the circular plate portion 61 of the second member 31, and the inner periphery thereof is supported by the cylindrical portion 62. The circumferentially opposite ends of the first spring 7 are engaged with the contact portions 68 and 64. Owing to the above structures, the first spring 7 is circumferentially compressed between the first and second members 30 and 31 in response to relative rotation therebetween. More specifically, the first spring 7 is compressed between one of the paired contact portions 68 on one side and one of the paired contact portions 64 on the opposite side.

When the first and second members 30 and 31 rotate relatively to each other, a frictional resistance occurs between the first and second members 30 and 31 which are pressed against each other by the conical spring 32. In this structure, the first and second members 30 and 31 functioning as the input and output members generate the frictional resistance so that additional members typically found in the prior art are not required for producing friction resistance. Therefore, the number of the parts can be reduced, and the damper 8 has a simple structure.

The second plate 13 has an inner peripheral portion 13a which is curved toward the second axial side. The inner peripheral portion 13a extends to a position near the second axial side of the first spring 7 and the outer peripheral surfaces of the cylindrical portion 62 and the boss 56. Thereby, the second axial sides of the first springs 7 are carried by the inner peripheral portion 13a. As described above, the second plate 13 supports the second axial side of the damper 8. More specifically, the first member 30 is carried by the main portion of the second plate 13, and the first springs 17 are supported by the inner peripheral portion 13a. As a result, the number of parts can be small, and the structure can be simple.

The structure employing the conical spring 32 for biasing can be a simple and can achieve an excellent effect.

A friction member 71 has an annular form, and is in contact with the inner peripheral portion of the surface, on the second axial side, of the intermediate body 3. The friction member 71 is biased toward the intermediate body 3 by a biasing member 72. The friction member 71 has engagement arms 73 which are non-rotatably engaged with the second plate 13.

Among the various kinds of circumferentially compressible springs, the first spring 7 has the smallest spring constant. The second spring 10 has the spring constant smaller than that of the third spring 5, and the fourth spring 6 has the largest spring constant.

The damper 8 can be handled as one unit when attaching the same to the plate 9b and the output rotary member 4 from the second axial side. For this attachment, the conical spring 32 is attached to the second member 31, and the first and second members 30 and 31 are engaged with each other in advance. After this pre-assembly, the first springs 7 are attached between the first and second members 30 and 31. The damper 8 thus completed as the single unit is afterward installed on the output rotary member 4 and the plate 9b. The engagement portions 67 are fitted into the recesses 44, and the engagement portions 63 are fitted into the apertures 58, respectively. In this manner, the damper 8 can be handled as the single unit and can be attached from one axial side so that the assembly steps can be simple.

Figure 6:
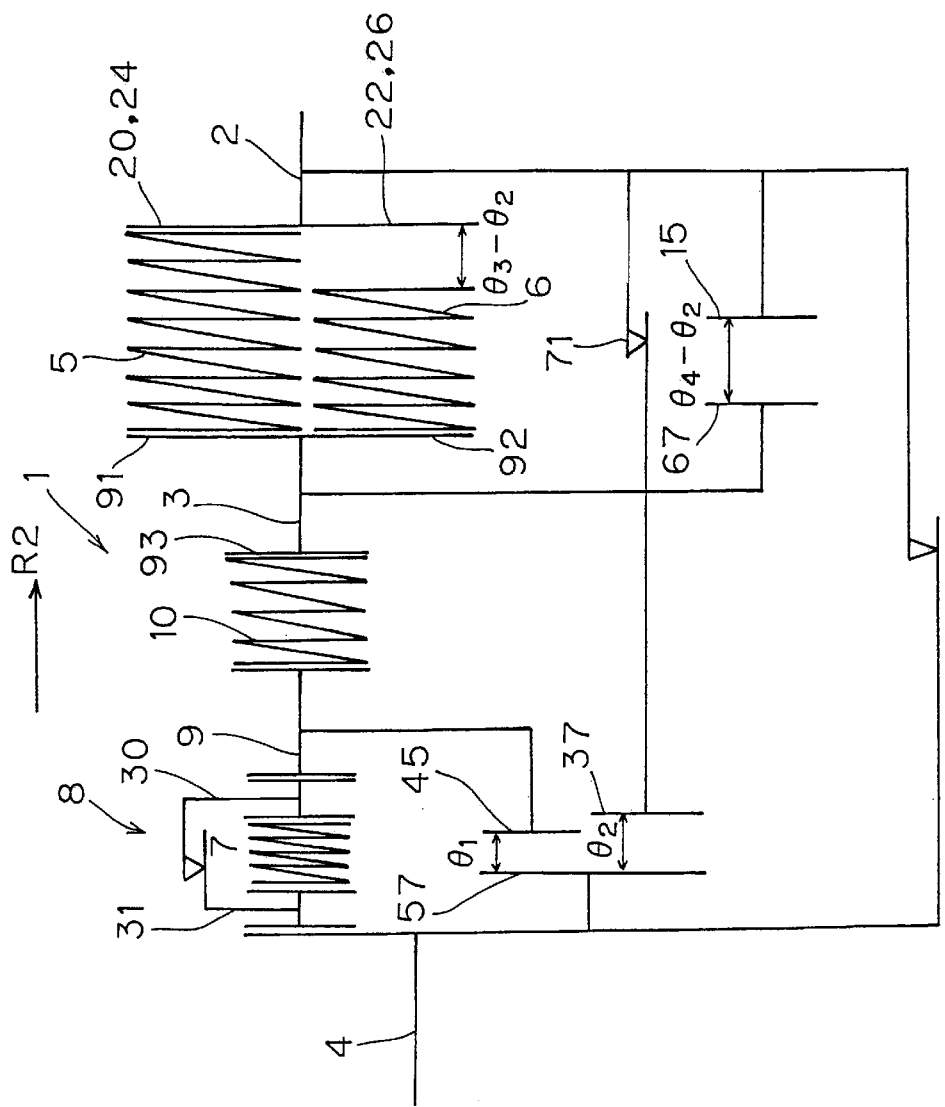
FIG. 6 is a mechanical circuit diagram of the clutch disk assembly depicted in FIGS. 1–5.

FIG. 6 is a mechanical circuit diagram of the damper mechanism of the clutch disk assembly 1. This figure represents relationships between the various members during the operation of the damper mechanism in one direction. As can be seen from the figure, even if the damper 8 were not disposed in the clutch disk assembly 1, the clutch disk assembly would produce the first stage of the characteristics without the operation of the spring and the friction mechanism until the torsion angle $\theta_1$. Thus, the clutch disk assemblies 1 can alternatively be manufactured without the damper 8 depending on the required characteristics.

When the friction portion 11 of the input rotary member 2 is pressed against the flywheel (not shown), the clutch disk assembly 1 is supplied with torque. The torque is transmitted successively through the first and second plates 12 and 13, third springs 5, intermediate body 3, second springs 10, intermediate member 9 and damper 8, and is finally transmitted from output rotary member 4 to the shaft (not shown). In the damper 8, the torque is transmitted from the first member 30 to the second member 31 through the first springs 7.

When a torque variation of the engine is transmitted to the clutch disk assembly 1, torsional vibration, i.e., is relative rotation occurs between the input rotary member 2 and the output rotary member 4 so that the third, fourth, second and first springs 5, 6, 10 and 7 are compressed.

The operation of the clutch disk assembly 1 will now be described below with reference to a characteristic diagram of FIG. 7. In the following description, it is assumed that the input rotary member 2 is fixed to another stationary device, and the output rotary member 4 is twisted in the rotating direction R2 relatively to the input rotary member 2.

Figure 7:
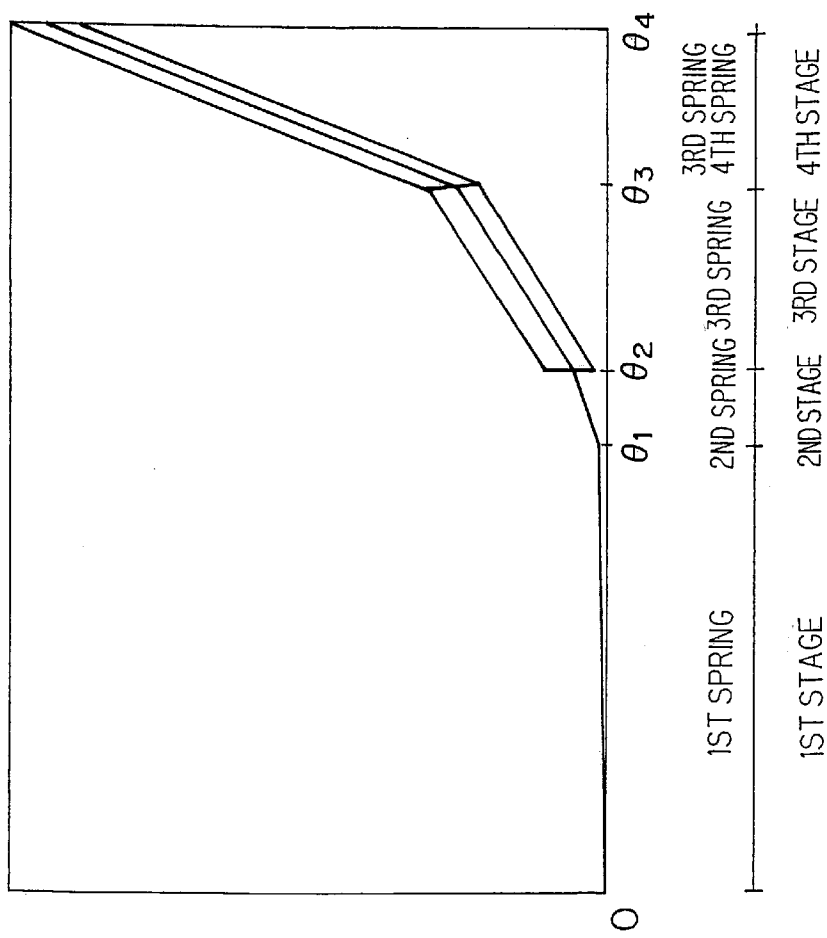
FIG. 7 is a chart showing the various torsion characteristics of the clutch disk assembly of the present invention.

Before the outer teeth 57 come into contact with the first inner teeth 45 and therefore the torsion angle is smaller than the first torsion angle $\theta_1$, the first springs 7 in the damper 8 are primarily compressed in the circumferential direction so that a characteristic of a low rigidity is exhibited in a first stage of torsion characteristics, as shown in FIG. 7. In the first stage, a small frictional resistance occurs between the first and second members 30 and 31. When the torsion angle increases to the first torsion angle $\theta_1$, the outer teeth 57 come into contact with the first inner teeth 45, and the relative rotation between the output rotary member 4 and the intermediate body 3 stops. Consequently, the first springs 7 are no longer compressed. In a second stage where the torsion angle is between the first and second torsion angles $\theta_1$ and $\theta_2$, the second springs 10 are circumferentially compressed between the intermediate member 9 and the intermediate body 3. In the second stage, a rigidity higher than that in the first stage is exhibited.

When the torsion angle increases to the torsion angle $\theta_2$, the outer teeth 57 come into contact with the second inner teeth 37, and the second springs 10 are no longer compressed. Thus, the relative rotation between the output rotary member 4 and the intermediate body 3 stops, and thereafter the relative rotation further occurs with respect to the input rotary member 2. Therefore, the third springs 5 are compressed in a third stage, and sliding occurs between the intermediate body 3 and the friction member 71. As a result, a characteristic of a high rigidity and a low hysteresis torque is exhibited in the third stage where the torsion angle is between the second and third torsion angles $\theta_2$ and $\theta_3$, as indicated in FIG. 7. The fourth springs 6 start to be compressed at the third torsion angle $\theta_3$ in a fourth stage and thereafter the fourth and third springs 6 and 5 are compressed in parallel so that a characteristic of a further increased rigidity is exhibited. When the pins 15 come into contact with the edges of recesses 69 at the fourth torsion angle $\theta_4$, respectively, the relative rotation between the output rotary member 4 and the input rotary member 2 stops.

As described above, the clutch disk assembly 1 can exhibit the torsion characteristics having the first to fourth stages, and therefore can appropriately absorb and damp different kinds of vibrations. In particular, the characteristic of a low rigidity and a small hysteresis torque is exhibited in the first stage smaller than the first torsion angle $\theta_1$. Therefore, gear noises during idling are suppressed. The characteristics of a middle rigidity is exhibited in the intermediate region from the first torsion angle $\theta_1$ to the second torsion angle $\theta_2$, i.e., in the intermediate region between the first and second stages. Therefore, the jumping phenomenon is suppressed.

Since the first springs 7 operate only in the first stage of the torsion characteristics, and are not compressed in the second stage. The second springs 10 are compressed only in the second stage of the torsion characteristics, and are not compressed in the third stage. In this manner, the springs for first stage and the springs for the second stage are compressed only in the intended stages, and are not compressed in the higher stages. Therefore, fatigue, breakage and others of the springs 7 and 10 are suppressed.

The invention may be employed in power transmitting devices other than the clutch disk assembly.

According to the damper disk assembly of the invention, the damper having the first elastic members, which function as the springs for the first stage in the torsion characteristics, is disposed at the position axially off set (spaced apart in an axial direction) from the first circular plate member. Therefore, a sufficiently large contact area can be ensured between contact portions of the hub and the first circular plate member.

What is claimed is:

1. A damper disk assembly comprising:
    a hub (4);
    a first circular plate member (3) disposed radially outside of said hub (4);
    an intermediate member (9b) disposed near said hub (4) and said first circular plate member (3);
    a second circular plate member (13) arranged on a second axial side of said first circular plate member (3);
    a second elastic member (10) circumferentially and elastically coupling said intermediate member (9b) and said first circular plate member (3) together;
    a third elastic member (5) circumferential and elastically coupling said first and second circular plate members (3, 13);
    a damper (8) having a first elastic member (7) circumferentially and elastically coupling said hub (4) and said intermediate member (9b) together, and axially offset from said first circular plate member (3);
    wherein
    said hub (4) has a radially projected portion (57), and said damper (8) is disposed on a radially outward side of said hub (4), said damper (8) being located axially between said projected portion (57) and said second circular plate member (13);

said damper (8) includes a first damper member (30) non-rotatably engaged with said intermediate member (9b), a second damper member (31) non-rotatably engaged with said hub, and said first elastic member (7) circumferentially and elastically coupling said first and second damper members (30, 31) together; and said first and second damper members (30, 31) are relatively movable in an axial direction with respect to each other, said first and second damper members (30, 31) have sliding portions in contact with each other, and said damper further has a biasing member (32) axially biasing said first and second damper members (30, 31) toward each other.

2. The damper disk assembly according to claim 1, wherein said first elastic member (7) is axially supported by said second circular plate member (13).

3. The damper disk assembly according to claim 1, wherein said second damper member (31) is axially movable with respect to said hub (4), said biasing member (32) is an elastic member arranged and compressed axially between said projected portion (57) and said second damper member (31), and said first damper member (30) is axially engaged with said second circular plate member (13).

4. The damper disk assembly according to claim 3, wherein said first elastic member (7) is axially supported by said second circular plate member (13).

* * * * *